(12) United States Patent
Jong

(10) Patent No.: US 7,697,645 B2
(45) Date of Patent: Apr. 13, 2010

(54) METHOD AND APPARATUS FOR REMOVING CHANNEL INTERFERENCE IN WIRELESS COMMUNICATION SYSTEM

(75) Inventor: Il-Yong Jong, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 811 days.

(21) Appl. No.: 11/513,991

(22) Filed: Aug. 31, 2006

(65) Prior Publication Data
US 2007/0165755 A1 Jul. 19, 2007

(30) Foreign Application Priority Data
Jan. 17, 2006 (KR) .................. 10-2006-0004735

(51) Int. Cl.
*H03D 1/04* (2006.01)
(52) U.S. Cl. ............... 375/346; 455/296; 370/335; 370/342
(58) Field of Classification Search .............. 375/148, 375/346; 455/296; 370/335, 342
See application file for complete search history.

(56) References Cited

U.S. PATENT DOCUMENTS

| | | | | |
|---|---|---|---|---|
| 5,253,298 A | * | 10/1993 | Parker et al. | 381/13 |
| 5,715,282 A | * | 2/1998 | Mansouri et al. | 375/350 |
| 5,974,101 A | * | 10/1999 | Nago | 375/350 |
| 6,901,243 B2 | | 5/2005 | Jayaraman et al. | 455/63.1 |
| 7,426,232 B2 | * | 9/2008 | Matsuoka et al. | 375/148 |
| 2002/0181568 A1 | * | 12/2002 | Prater | 375/222 |
| 2004/0225657 A1 | | 11/2004 | Matsusaka | 455/278.1 |
| 2005/0164665 A1 | * | 7/2005 | Suganuma | 455/278.1 |

FOREIGN PATENT DOCUMENTS

JP 2004-297574 10/2004

* cited by examiner

Primary Examiner—David C Payne
Assistant Examiner—Leon Flores
(74) Attorney, Agent, or Firm—F. Chau & Associates, LLC

(57) ABSTRACT

A wireless communications receiving apparatus and a method for removing interference in a wireless communication system. The apparatus removes interferences and comprises a power detector, a channelization filter, a channel filter unit having a plurality of filters (e.g., including an all-pass filter, a low-pass filter and a high-pass filter), a plurality of interference power detectors corresponding to the plurality of filters, a channel filter selection block and a multiplexer. The power detector receives a digital signal and detects its power, the channelization filter selects a signal having a predetermined channel frequency from the received digital signal; the channel filter unit has a plurality of filters each for receiving and filtering the signal output from the channelization filter; each of the plurality of interference power detectors respectively receives a stored training signal and a training signal received within an output signal of a corresponding filter among the plurality of filters and calculates a plurality of corresponding interference powers; the channel filter selection block outputs a selection signal based on the power of the first signal; the interference powers calculated from the plurality of interference power detectors and a plurality of reference values; and the multiplexer selects any one from the output signals of the plurality of filters based on the selection signal.

12 Claims, 4 Drawing Sheets

METHOD AND APPARATUS FOR REMOVING CHANNEL INTERFERENCE IN WIRELESS COMMUNICATION SYSTEM

CROSS-REFERENCE TO RELATED PATENT APPLICATION

This application claims priority under 35 U.S.C. §119 of Korean Patent Application No. 10-2006-0004735, filed on Jan. 17, 2006, which is hereby incorporated herein in its entirety by reference.

BACKGROUND OF THE INVENTION

1. Field of the Invention

The present invention relates to a receiver in a wireless communication system and, more particularly, to a receiving apparatus and method for removing channel interference in a wireless communication system.

2. Description of Related Art

A receiver of a wireless communication system requires 3 types of conversions including the frequency down-conversion to convert an RF signal (radio frequency signal) to a baseband signal, the sampling conversion (ADC) to convert an analog signal baseband signal to a digital signal, and the quantization conversion.

FIG. 1 is a schematic block diagram of a conventional receiver in a wireless communication system. Referring to FIG. 1, the receiver 10 comprises an antenna 15, a RF tuner 20, an analog-digital conversion (ADC) block 30, a channelization filter 40, an equalizer 50 and a channel estimator 60. The RF tuner 20 tunes to a frequency of a channel that is intended to be received through the antenna 15 and converts the tuned frequency RF signal into a baseband signal (having a baseband frequency range). The analog-digital conversion (ADC) block 30 converts an analog baseband signal Sa (having the baseband frequency range) into a digital baseband signal.

The channelization filter 40 selects and outputs only the signal of a desired band among the digital (baseband) signals and having a predetermined bandwidth at a predetermined center-frequency and a predetermined sample rate. The equalizer 50 receives the signal output from the channelization filter 40 and regenerates the high frequency component of the received signals which is attenuated by dispersion of pulse caused by reduction or distortion due to transmission media, based on the channel information from the channel estimator 60. The channel estimator 60 receives the signal output from the channelization filter 40 and estimates channel information such as the channel transfer function and provides it to the equalizer 50.

The performance of the wireless communication system (for example, Global System for Mobile Communication and Enhanced Data Rates for GSM Evolution) is deteriorated by various interferences that may occur in the wireless communication environment, and thus a technical countermeasure against such interferences is needed.

Generally, the interference that may occur in the wireless communication system includes co-channel interference and adjacent-channel interference. The co-channel interference includes interference between base stations using a same frequency and interference from other systems such as undercover stations. The adjacent-channel interference includes interference between base stations in a same system using adjacent frequencies and interference between adjacent systems.

Some areas such as an urban downtown, where numerous users are present, need a higher number of base stations in a relatively small area and may have the co-channel interference by a frequency reuse cell and the adjacent channel interference by a user of an adjacent channel.

Since the interference occurs in the unit of burst in the wireless communication using time division multiple access (TDMA), there is no correlation with interference between bursts. Therefore, it is desired to have a method for independently removing interference within each unit of burst.

In the wireless communication system, a receiver should be provided with an interference removing means for removing the above-described co-channel interference or adjacent-channel interference. A channel condition is classified into a channel having thermal noise (hereinafter referred to as "static channel") or a channel having ghost or multi-path fading (hereinafter referred to as "fading channel").

If a filter is selected to remove the channel interference by applying predetermined reference values without regard to the condition of the channel, there would be differences in sensitivity and performance of the receiver according to whether the channel is affected by adjacent-channel interference or co-channel interference.

Particularly, a receiver has less sensitivity for the static channel than for the multi-path channel.

SUMMARY OF THE INVENTION

It is desired to have a means for adaptively removing channel interference based on determining the static/fading condition of the channel and a reliable judgment method in detection of the adjacent-channel interference. An aspect of the present invention provides a receiver in a wireless communication system, that increases reliability of removing channel interference by selecting a channel filter for removing channel interference signal based upon measuring the power of the whole digital signal output by an analog-digital block (for example, an output signal of a CIC filter) and that improves the sensitivity of the receiver which is important for a static channel, by adaptively modifying reference values used for selection of a channel filter by determining between a static channel and a fading channel.

According to an aspect of the present invention, there is provided a receiver of a wireless communication system comprising an analog-digital converter (ADC), a power detector, a channelization filter, a channel filter unit, a plurality of interference power detectors corresponding to a plurality of filters, a channel filter selection block (for selecting one of the plurality of filters) and a switch block (multiplexer).

The analog-digital converter (ADC) converts an analog signal having a baseband frequency into a digital signal. The power detector receives the digital signal and detects the power of the received digital signal. The channelization filter receives the digital signal and selects a signal having a predetermined channel frequency from within the received digital signal. The channel filter unit has the plurality of filters (e.g., including an all-pass filter, a low-pass filter and a high-pass filter), each of which receives and filters a signal output from the channelization filter.

Each of the plurality of interference power detectors respectively receives a stored training signal and a training signal received within an output signal of a corresponding filter among the plurality of filters and calculates a corresponding interference power. The channel filter selection block outputs a selection signal based on the power output from the power detector, the interference powers detected from the plurality of interference power detectors and a plurality of reference values. The switch block (multiplexer) outputs one output selected from the output signals of the plurality of filters, according to the selection signal.

Additional and/or other aspects and features of the present invention will be set forth in the description which follows or may be learned by practice of the disclosed invention.

BRIEF DESCRIPTION OF THE DRAWINGS

The above and/or other aspects and features of the present invention will become apparent and more readily appreciated from the following detailed description, taken in conjunction with the accompanying drawings in which, like numerals denote like elements, and.

DETAILED DESCRIPTION OF EXEMPLARY EMBODIMENTS OF THE INVENTION

Figure 1:
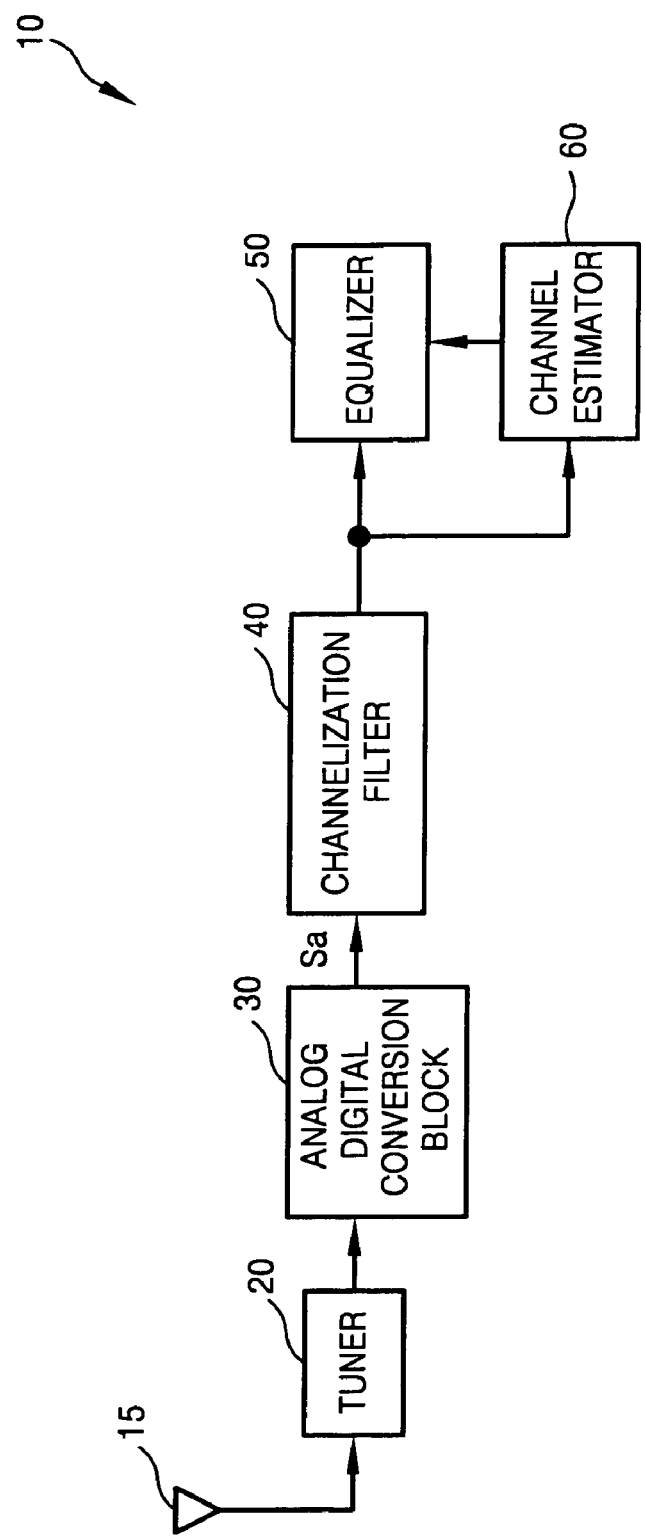
FIG. 1 is a schematic block diagram of a receiver in a conventional wireless communication system.
Figure 2:
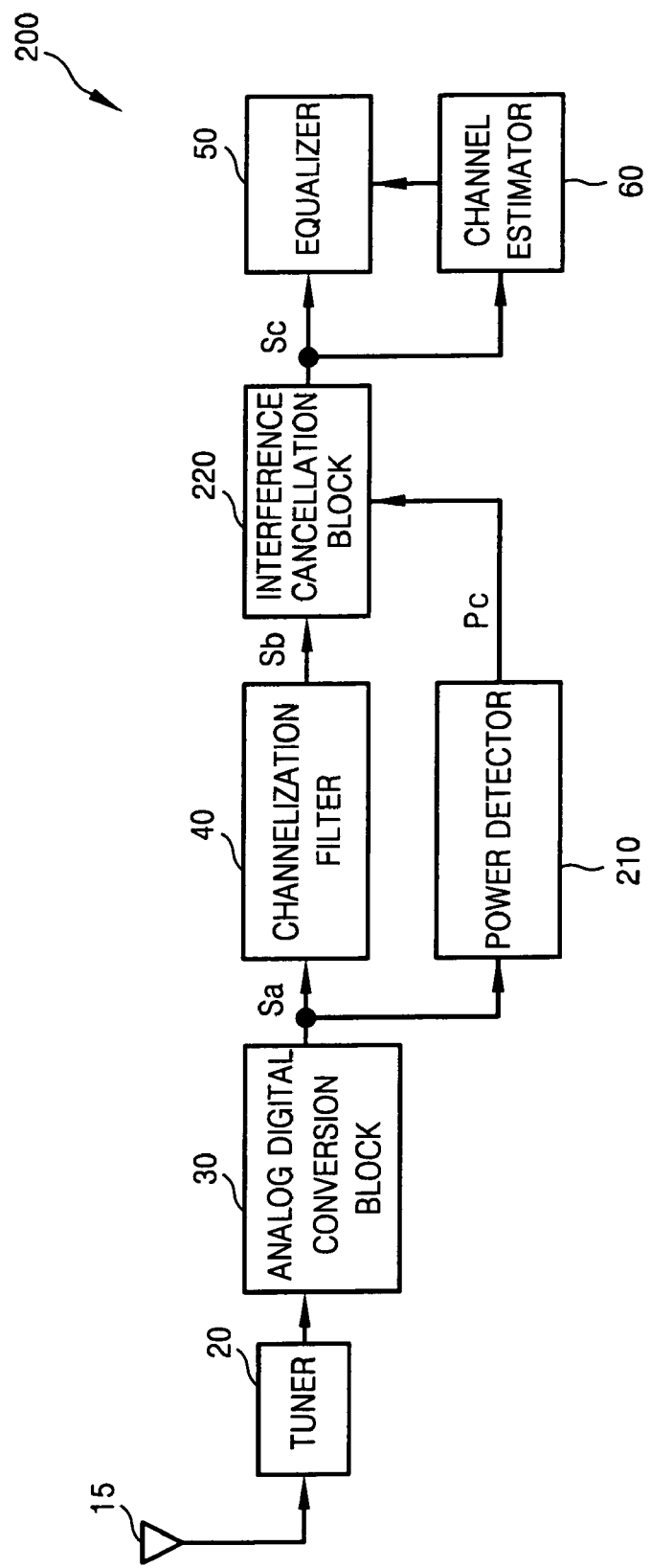
FIG. 2 is a block diagram of a receiver according to an embodiment of the present invention in a wireless communication system.

FIG. 2 is a block diagram of a receiver 200 of a wireless communication system according to an embodiment of the present invention. Referring to FIG. 2, the receiver 200 comprises an antenna 15, a tuner 20, an analog-digital conversion block 30, a channelization filter 40, an equalizer 50, a channel estimator 60, a power detector 210 and an interference cancellation block 220.

The tuner 20 tunes to a signal having a frequency of a channel to be received through the antenna 15 and converts the tuned signal into a (baseband) signal having a baseband frequency.

The analog-digital conversion (ADC) block 30 samples the (baseband) signal having the baseband frequency and changes the sampling ratio of the sampled signal. Typically, a Sigma-Delta converter is used as a sampling circuit (not shown) for sampling the signal having the baseband frequency and a CIC filter (Cascaded Integrator Comb filter) is used as a filter (not shown) for changing the sampling rate.

The power detector 210 receives an output signal Sa of the analog-digital conversion block 30 and measures the power $P_C$ of the received signal in a unit of burst. The output signal Sa of the analog-digital conversion block 30 may be an output signal of the CIC filter (not shown). The channelization filter 40 receives the output signal Sa of the analog-digital conversion block 30 and selects and outputs a signal Sb having a predetermined channel frequency (for example, a signal having the same channel frequency) from among the received signals Sa. The interference cancellation block 220 removes interference from the selected signal Sb output from the channelization filter 40.

Figure 3:
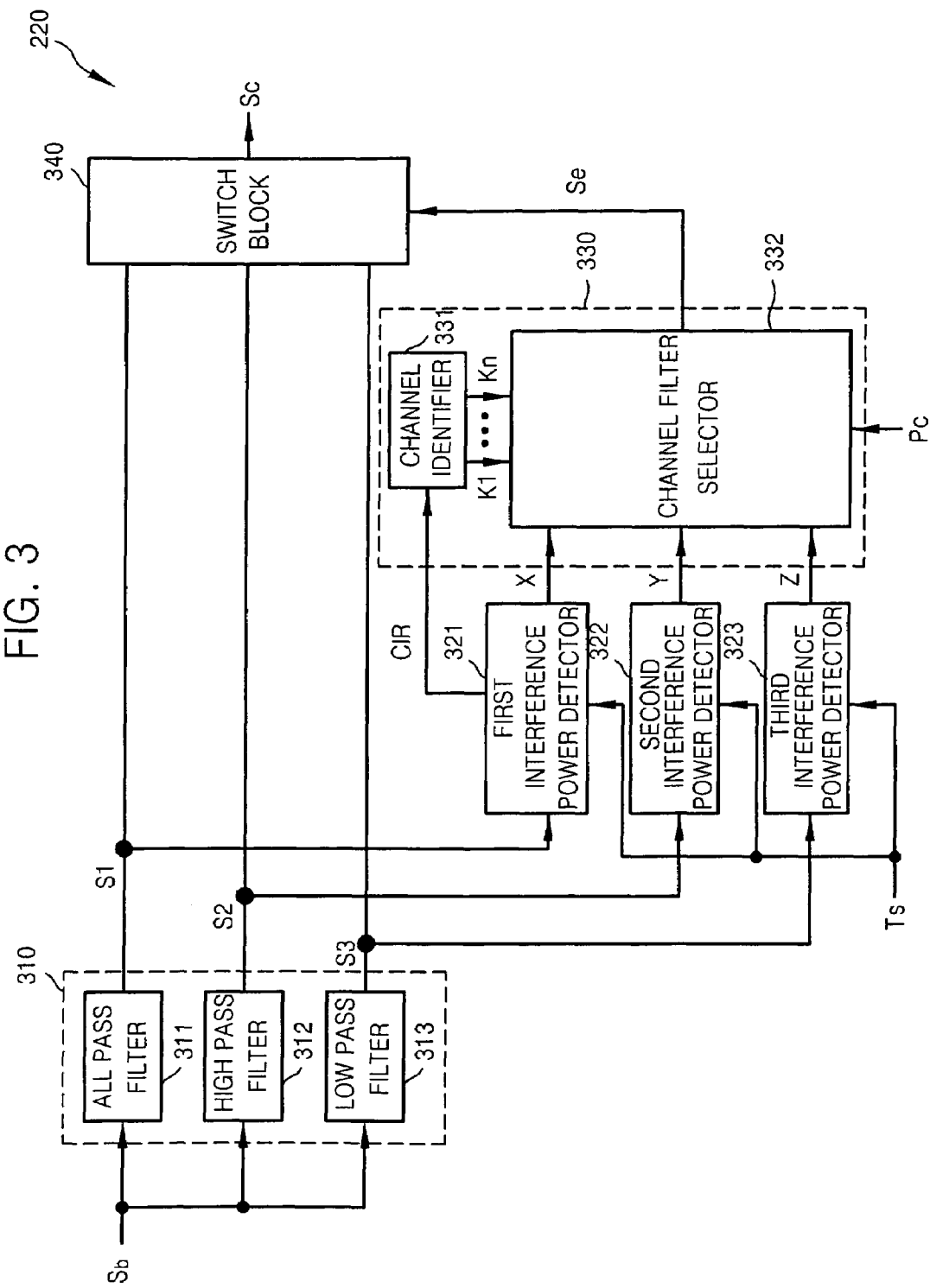
FIG. 3 is a block diagram of the interference cancellation block 220 shown in FIG. 2.

FIG. 3 is a detailed block diagram of the interference cancellation block 220 shown in FIG. 2. Referring to FIGS. 2 and 3, the interference cancellation block 220 comprises a channel filter unit 310, a plurality of interference power detectors 321 to 323, a channel selection block 330, and a switch block (multiplexer) 340.

The channel filter unit 310 comprises a plurality of different channel filters 311 to 313, each of which receives and differently filters the signal Sb output from the channelization filter 40. The plurality of channel filters 311 to 313 may include an all-pass filter 311, a high-pass filter 312, and a low-pass filter 313. The all-pass filter 311, the-high-pass filter 312 and the-low-pass filter 313, output corresponding filtered signals S1, S2, and S3 respectively. Each of the plurality of different channel filters 311 to 313 may be implemented as a FIR (Finite Impulse Response) filter, to filter out white noise distributed in predetermined bands (all, high, low).

For example, the high-pass filter 312 is a filter appropriate to remove the co-channel interference (CCI) and the low-pass filter 313 is a filter appropriate to remove adjacent-channel interference (ACI). An "all-pass filter" is a filter whose spectral magnitude is unity. The simplest example of an all-pass filter is the delay operator $Z = e^{2\omega}$ itself: its phase as a function of $\omega$ is simply $\omega$. A plurality of identical interference power detectors 321, 322, and 323 are each configured to receive a stored "training signal" Ts and a received training signal within a predetermined one of filtered signals S1, S2 and S3 and calculate therefrom a first interference signal power X, a second interference signal power Y, and a third interference signal power Z, respectively.

The channel filter selection block 330 comprises a channel identifier 331 and a channel filter selector 332. The channel filter selector 332 of the channel filter selection block 330 outputs a selection signal Se based on the power signal Pc output from the power detector 210, the plurality of interference powers X, Y and Z, and a plurality of reference values K1, ..., Kn.

The channel identifier 331 determines between a static channel and a fading channel, in response to a channel prediction signal (Channel Impulse Response, CIR) produced on the basis of the stored training signal Ts and the received training signals within the output signals of the all-pass filter 311, and generates a plurality of reference values K1, ..., Kn used to decide between the co-channel interference (CCI) and the adjacent-channel interference (ACI) based on the result of the determination.

The channel identifier 331 determines a channel to be the static channel when the ratio of the sum of a plurality of first powers to the sum of a plurality of second powers is less than a predetermined (reference) value ($A^2$). Here, the plurality of first powers are respectively a maximum power in a discrete power spectrum of the channel prediction signal CIR produced based on the stored training signal Ts and on the training signals received within the output signal of the all-pass filter 311. Each of the plurality of second powers is the sum of the remaining powers in the discrete power spectrum other than) the maximum power in the discrete power spectrum.

The ratio of the sum of the first powers to the sum of the second powers is calculated by using the following Equation 1.

$$\sum_{n=0}^{N-1} \Gamma(k, n) = \frac{\sum_{i=1}^{k} |Xn(i)|^2}{\sum_{i=1}^{k} |Xz(i)|^2} \leq A^2, (n = 0, \ldots, N-1, n \neq z) \quad \Box\text{Equation 1}\Box$$

In the above Equation 1, the denominator of the right side represents the sum of maximum powers Xz in the discrete power spectrum of the signal CIR of the K (K>1, a natural number) burst and the numerator represents the sum of the remaining powers Xn (n=0, ... N−1, n≠z, N>1, N is a natural number) other than the maximum powers. Therefore, in the above Equation 1, the denominator of the right side is the sum of the first powers and the numerator of the right side is the sum of the second powers. If the value produced from the Equation 1 is less than or equal to a predetermined reference value ($A^2$), it is determined to be a static channel while if the value is greater than the reference value, it is determined to be a fading channel.

The channel identifier 331 determines whether a received channel is a static channel or a fading channel by the above described method and generates the plurality of reference values K1, . . . , Kn to determine between the co-channel interference (CCI) and the adjacent-channel interference (ACI) according to the result of the static channel or fading channel determination.

The channel filter selector 332 outputs the selection signal Se based on the output power Pc calculated by the power detector 210, the interference powers X, Y and Z calculated by the plurality of interference power detectors 321 to 323 and the plurality of reference values K1 to Kn.

For example, when the smaller value among the interference powers X and Y is less than the value of the interference power Z, it is determined that there is adjacent-channel interference (ACI), and so, the channel filter selector 332 outputs the selection signal Se to select the output of the low-pass filter (ACI filter) 313 among the outputs of the plurality of channel filters 311 to 313.

Otherwise, when the value of the power X is greater than the value produced by multiplying the reference value K2 by the value of the power Y, it is determined that there is co-channel interference (CCI), and so, the channel filter selector 332 outputs the selection signal Se to select the output of the high-pass filter (CCI filter) 312 among the outputs of the plurality of channel filters 311 to 313. In other cases than those described above, it is determined that there is no channel interference, and so, the output of the all-pass filter 311 is selected.

When the channel filter selector 332 determines that there is adjacent-channel interference, as described above, and selects the output of the low-pass filter (ACI filter) 313 to remove the adjacent-channel interference, the low-pass filter (ACI filter) 313 may be selected even though there is no adjacent-channel interference.

In this case, the receiver has less sensitivity for the static channel than for the fading channel. In order to prevent this, when the channel filter selector 332 selects any one channel filter (for example, the ACI filter) among the channel filters 311 to 313, the reliability of the channel filter selector 332 may be increased by reducing the error probability in the adjacent-channel interference (ACI) detection by deciding whether there actually is adjacent-channel interference (ACI) based on the output power Pc of the power detector 210. The switch block (multiplexer) 340 selects and outputs any one signal Sc selected from among the output signal S1 of the all-pass filter 311, the output signal S2 of the high-pass filter 312 and the output signal S3 of the low-pass filter 313, based on the selection signal Se.

Figure 4:
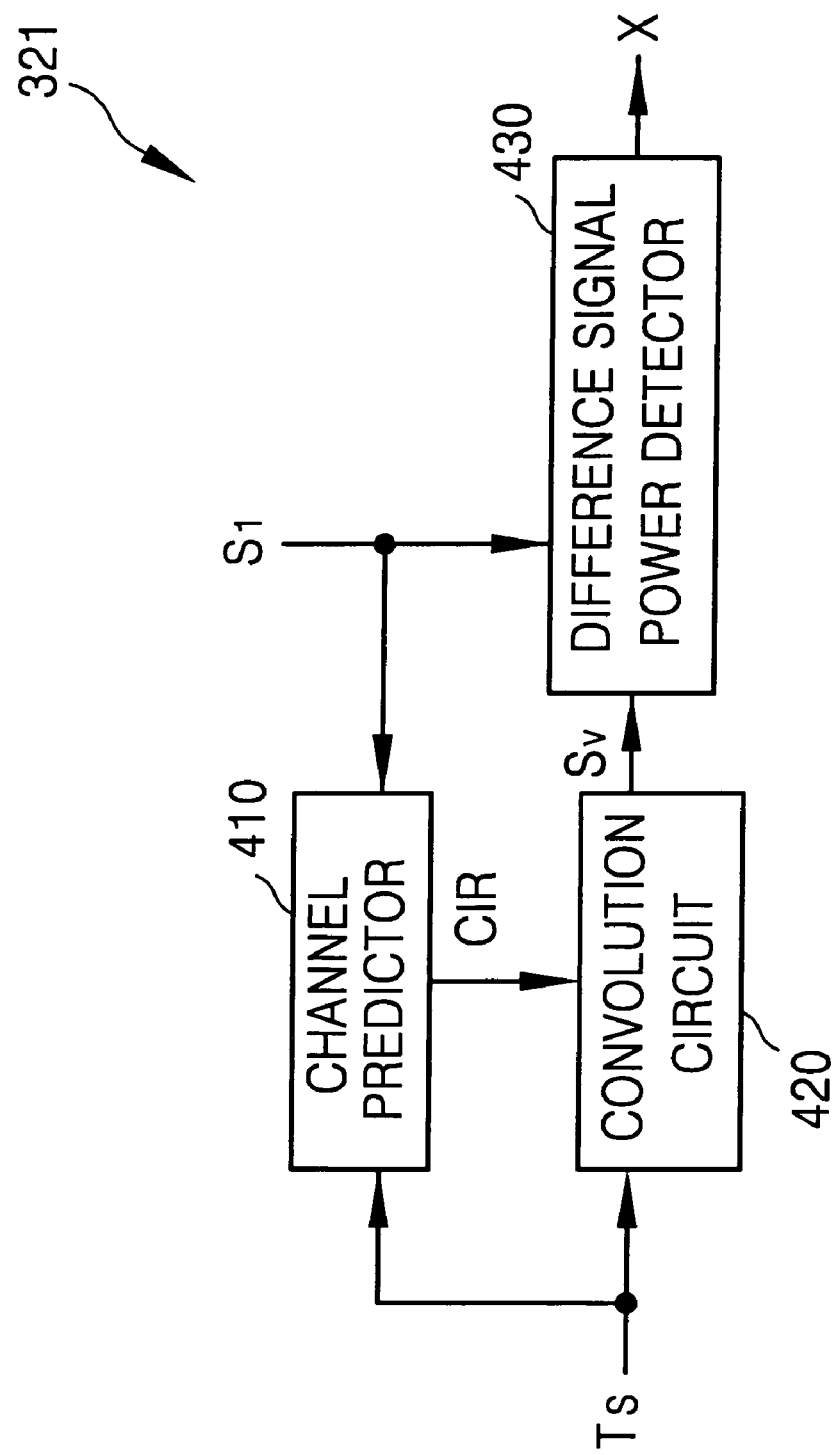
FIG. 4 is a block diagram of the first interference power detector 321 shown in FIG. 3.

FIG. 4 is a block diagram of the first interference power detector 321 shown in FIG. 3. Referring to FIG. 4, the first interference power detector 321 comprises a channel predictor 410, a convolution circuit 420 and a difference signal power detector 430. The second interference detector 322 and the third interference detector 323 have the same structure as the first interference detector 321 except that they have different input/output signals from those of the first interference power detector 321.

The channel predictor 410 outputs a channel prediction signal (channel impulse response (CIR) which represents the measured transfer function of the channel) based on the received training signal received within the output signal S1 of the all-pass filter 311 and the known (stored) training signal Ts. For example, the channel predictor 410 may produce the channel prediction signal CIR by correlating the output signal S1 of the all-pass filter 311 with the stored training signal Ts and outputting a correlated signal as the channel prediction signal CIR, or by the least square method. Here, the stored training signal (a predetermined, known, Training Symbol) Ts is a signal that the receiver stores (a known pattern signal), including a pilot signal and the like.

The convolution circuit 420 convolves the stored training signal Ts and the received training signal received within the output signal CIR of the channel predictor 410 and outputs a convolved signal Sv. The difference signal power detector 430 calculates the difference power X between the output signal S1 of the all-pass filters in the channel filter unit 310 and the output signal Sv of the convolution circuit 420.

Therefore, the first interference power detector 321 detects the interference signal power X by using the received training symbol in the training section of the output burst received through the all-pass filter 311 in the channel filter unit 310.

As described above, the receiving apparatus and method for removing interferences in a wireless communication system according to embodiments of the present invention increases reliability in selecting a channel filter to remove the channel interference signal by measuring the power of an output signal of an analog-digital block (for example, an output signal of a CIC filter) in the receiver and improves sensitivity of the receiver that is important for a static channel by adaptively modifying reference values which are used as standards for selection of a channel filter based on distinguishing between a static channel and a fading channel.

Although exemplary embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A circuit for removing an interference signal in a receiver of a wireless communication system comprising:
a power detector configured to receive a first signal and to detect the power of the first signal;
a band-pass filter receiving and filtering the first signal;
a channel filter unit having a plurality of filters, each receiving and filtering a signal output from the band-pass filter;
a plurality of interference power detectors, each interference power detector receiving a stored training signal and a training signal received within the output signal of a corresponding filter among the plurality of filters and calculating the corresponding interference power;
a channel filter selection block for outputting a selection signal based on:
the power of the first signal,
the interference powers detected from the plurality of interference power detectors,
and a plurality of reference values; and
a multiplexer for outputting a selected output from the among the output of the plurality of filters, based on the selection signal;
wherein the plurality of filters of the channel filter unit include an all-pass filter, a high-pass filter and a low-pass filter; and
each of the plurality of interference power detectors receives a stored training signal and a received training signal within the output signal of a corresponding filter among the plurality of filters and calculates therefrom a first interference signal power, a second interference signal power and a third interference signal power, respectively; and the multiplexer is configured to output the selected one among the output signal of the all-pass filter, the output signal of the high-pass filter and the output of the low-pass filter;

wherein each of the plurality of interference power detectors comprises:

a channel predictor for outputting a channel prediction signal (CIR) based on the stored training signal and a received training signal within the corresponding output signal among the output signal of the all-pass filter, the output signal of the high-pass filter and the output signal of the low-pass filter;

a convolution circuit for convolving the stored training signal and the channel prediction signal (CIR); and a difference signal power detector for detecting the power of the difference between the output signal of the convolution circuit and the received training signal within the corresponding output signal among the output signal of the all-pass filter, the output signal of the high-pass filter and the output signal of the low pass-filter.

2. The circuit of claim 1, wherein the channel predictor produces the channel prediction signal (CIR) by correlating the stored training signal with a received training signal within the corresponding output signal among the output signal of the all-pass filter, the output signal of the high-pass filter and the output signal of the low-pass filter.

3. The circuit of claim 1, wherein the channel filter selection block comprises:

a channel identifier for determining between a static channel and a fading channel in response to the channel prediction signal produced on the basis of the stored training signal and the output signal of the all-pass filter, and for generating a plurality of reference values used for deciding between the co-channel interference and the adjacent-channel interference based on the result of the static channel—fading channel determination; and a channel filter selector for outputting the selection signal based on the power of the first signal, the interference powers calculated by the plurality of interference power detectors and the plurality of reference values.

4. The circuit of claim 3, wherein the channel identifier determines a received channel to be a static channel when the ratio of the sum of a plurality of first powers to the sum of a plurality of second powers is less than a predetermined value, wherein:

the plurality of first powers are the maximum powers in a discrete power spectrum of the channel prediction signal calculated from the stored training signal and a received training signal within the output signal of the all-pass filter; and the plurality of second powers are powers in the discrete power spectrum other than the maximum powers calculated from the stored training signal and the received training signal within the output signal of the all-pass filter.

5. A receiver for a wireless communication system comprising:

an analog-digital converter for converting an analog signal having a baseband frequency into a digital signal;

a power detector for receiving the digital signal output by the analog-digital converter and for calculating the power of the received digital signal;

a channelization filter for receiving the digital signal output by the analog-digital converter and for selecting a signal having a predetermined channel frequency within the received digital signal;

a channel filter unit having a plurality of filters, each filter receiving and filtering a signal output from the channelization filter;

a plurality of interference power detector, each detector receiving a stored training signal and an output signal output of a corresponding filter among the plurality of filters and calculating the corresponding interference power;

a channel filter selection block for outputting a selection signal based on the power of the first signal, the interference powers calculated by the plurality of interference power detectors and a plurality of reference values; and a multiplexer for outputting a one output selected front among the output signals of the plurality of filters, according to the selection signal;

the plurality of filters in the channel filter unit include an all-pass filter, a high-pass filter and a low-pass filter;

each of the plurality of interference power detectors receives a stored training signal and an output signal of a corresponding filter among the all-pass filter, the high-pass filter and the low-pass filter and calculates therefrom a first interference signal power, a second interference signal power and a third interference signal power, respectively;

the channel filter selection block outputs the selection signal based on the first signal power, and the first interference signal power, the second interference signal power and the third interference signal power; and the multiplexer outputs the selected one among the output signal of the all-pass filter, the output signal of the high-pass filter and the output signal of the low-pass fitter according to the selection signal;

wherein each of the plurality of interference power detectors comprises:

a channel predictor for outputting a channel prediction signal based on the stored training signal, and a received training signal within a corresponding output signal among the output signal of the all-pass filter, the output signal of the high-pass filter and the output signal of the low-pass filter;

a convolution circuit for convolving the stored training signal and the channel prediction signal; and a difference signal power detector for calculating the difference power between an output signal of the convolution circuit and a corresponding output signal among the output signal of the all-pass filter, the output signal of the high-pass filter and the output signal of the low-pass filter.

6. The receiver of claim 5, wherein the channel predictor produces the channel prediction signal by correlating the stored training signal with a received training signal within the corresponding output signal among the output signal of the all-pass filter, the output signal of the high †-pass filter and the output signal of the low-pass filter.

7. The receiver of claim 5, wherein the channel filter selection block comprises:

a channel identifier for determining between a static channel and a fading channel, in response to the channel prediction signal; and a channel filter selector for outputting the selection signal based on the power of the digital signal, the interference powers detected from the plurality of interference power detectors and the plurality of reference values.

8. The receiver of claim 7, wherein the channel identifier determines a received channel to be a static channel when the ratio of the sum of a plurality of first powers to the sum of a plurality of second powers is less than a predetermined value, wherein:

each of the plurality of first powers is a maximum power in a discrete power spectrum of the channel prediction signal and each of the plurality of second powers is a power other than the maximum power in the discrete power spectrum of the channel prediction signal.

9. A method for removing an interference signal in a receiver of a wireless communication system, method comprising:

(1) receiving a first signal and detecting the power of the first signal;

(2) selecting a signal having a predetermined channel frequency from the received first signal;

(3) filtering the predetermined channel frequency signal from the step (2) through each of an all-pass filter, a high-pass filter and a low-pass filter and outputting filtered signals in parallel;

(4) comparing a stored training signal and the received training signal within each output signal among the signal output from the step (3) and calculating interference powers therefrom, respectively;

(5) outputting a selection signal based on the power of the first signal, the interference powers calculated in the step (4) and a plurality of reference values; and (6) selecting one signal among the filtered signals from the step (3) based on the selection signal;

wherein the step (4) comprises:

producing a channel prediction signal based on the stored training signal and a training signal received within the corresponding signal among the filtered signals from the step (3);

convolving the training signal and the channel prediction signal; and detecting the power of the difference between an output signal from the convolution step and a corresponding signal among the filtered signals from the step (3).

10. The method of claim 9, wherein the step of producing the channel prediction signal is performed by correlating the stored training signal with the received training signal within a corresponding output signal among the output signal of the all-pass filter, the output signal of the high-pass filter and the output signal of the low-pass filter.

11. The method of claim 9, wherein the step (5) comprises:

determining between a static channel and a fading channel based on the channel prediction signal produced using the stored training signal and the training signal received within the output signal of the all-pass filter and generating a plurality of reference values to determine between co-channel interference and adjacent-channel interference based on the result of the static channel—fading channel determination; and outputting the selection signal based on the power of the first signal, the plurality of reference values and the interference powers detected from the step (4).

12. The method of claim 11, wherein the generating of the plurality of reference values includes determining a received channel to be a static channel when the ratio of the sum of a plurality of first powers to the sum of a plurality of second powers is less than a predetermined value, in which each of the plurality of first powers is a maximum power in a discrete power spectrum of the channel prediction signal; and each of the plurality of second powers is a power other than the maximum power in the discrete power spectrum of the channel prediction signal.

* * * * *